United States Patent [19]
Plumer

[11] Patent Number: 5,957,145
[45] Date of Patent: Sep. 28, 1999

[54] SELECTIVELY MOVEABLE UMBRELLA

[76] Inventor: Richard P. Plumer, 4094 Stonecypher Rd., Suwanee, Ga. 30024

[21] Appl. No.: 08/975,306

[22] Filed: Nov. 20, 1997

[51] Int. Cl.[6] .................................................. A45B 3/00
[52] U.S. Cl. ........................ 135/16; 135/117; 280/47.34; 280/62; 248/519
[58] Field of Search ............................ 135/16, 20.3, 24, 135/19, 117; 280/47.34, 649, 650, 47.31, 62; 108/19; 248/511, 519

[56] References Cited

U.S. PATENT DOCUMENTS

| | | | |
|---|---|---|---|
| D. 279,833 | 7/1985 | Eberle | D3/5 |
| D. 323,582 | 2/1992 | Volcani | D3/5 |
| D. 338,327 | 8/1993 | Lewis | D3/5 |
| D. 376,903 | 12/1996 | Harris | D3/5 |
| 3,216,686 | 11/1965 | Bjerre | 135/16 X |
| 3,748,437 | 7/1973 | Keeshin et al. | 312/236 X |
| 3,866,934 | 2/1975 | Braun | 280/36 C |
| 3,889,698 | 6/1975 | Roessl | 135/2 |
| 3,940,099 | 2/1976 | McCleskey | 248/511 |
| 4,000,750 | 1/1977 | Becher | 135/16 |
| 4,174,532 | 11/1979 | Kelley | 362/102 |
| 4,334,692 | 6/1982 | Lynch | 280/79.1 A |
| 4,347,862 | 9/1982 | Secon | 135/20 R |
| 4,365,819 | 12/1982 | Bart | 297/184 X |
| 4,449,542 | 5/1984 | McSwain | 135/98 |
| 4,455,030 | 6/1984 | Rosen | 280/47.19 |
| 4,458,707 | 7/1984 | Lindaman | 135/90 |
| 4,790,338 | 12/1988 | Strobl | 135/16 |
| 4,832,163 | 5/1989 | Levesque | 190/11 |
| 4,848,385 | 7/1989 | Pennella | 135/16 |
| 4,863,075 | 9/1989 | Romer | 108/19 X |
| 5,086,712 | 2/1992 | Clark | 108/50 |
| 5,088,751 | 2/1992 | Zint | 280/47.34 |
| 5,188,138 | 2/1993 | Yamasaki et al. | 135/65 |
| 5,287,871 | 2/1994 | Trice | 135/88 |
| 5,297,570 | 3/1994 | Conner | 135/16 |
| 5,299,588 | 4/1994 | MacLeod | 135/16 |
| 5,396,915 | 3/1995 | Bomar | 135/16 |
| 5,431,364 | 7/1995 | Etter | 248/514 |
| 5,464,237 | 11/1995 | Saporiti | 280/47.34 X |
| 5,480,170 | 1/1996 | Kaiser, II | 280/47.34 X |
| 5,505,645 | 4/1996 | Engler, Jr. | 441/1 |

*Primary Examiner*—Carl D. Friedman
*Assistant Examiner*—Winnie S. Yip
*Attorney, Agent, or Firm*—Kennedy, Davis & Hodge

[57] ABSTRACT

A selectively moveable umbrella (10) for use in providing shade during outdoor leisure and work-related activities, in which a support holds an umbrella post (36) with a first end (37) and a canopy (41) attached to a plurality of support ribs extending from a portion of the post near a second end (39) distal from the first end. The support attaches to a triangular base frame (12). An elongated handle (28) extends outwardly from under the canopy from a corner edge (13) of the base frame. Two back wheels (34) are attached to the base frame near an end remote from the handle and an additional support (24) depends from an end of the base frame remote from the back wheels. Using the handle, the base frame is moved in order to wheel the umbrella to a new position for shading outdoor activities.

11 Claims, 3 Drawing Sheets

SELECTIVELY MOVEABLE UMBRELLA

TECHNICAL FIELD

The present invention relates to umbrellas. More particularly described, the present invention relates to umbrellas selectively moveable for shading work and leisure activities from the sun.

BACKGROUND OF THE INVENTION

Umbrellas have long provided protection from both rain and sun in a variety of leisure and work-related situations. For instance, hand-held umbrellas shelter persons from rain. Larger umbrellas offer protection from exposure to the sun while on a beach. Large canopied umbrellas have also been developed for backyard use in recreational activities such as for shading persons while reading, eating, and the like.

Umbrellas conventionally have an elongated support post with a free end and an extendable canopy at an end distal from the free end. The canopy is typically supported by a plurality of ribs radiating from the post. The ribs typically extend radially from a slide collar that travels on the post in order to move the canopy from a closed position to an open position for shading and providing rain cover. The canopy is generally made of a fabric material such as a canvas or plastic weave. Alternatively the canopy can be made of a solid plastic with a fixed orientation with respect to the post. The canopy typically extends to a perimeter of between about three and six feet for a personal umbrella and up to eight feet for a larger beach or backyard (recreational) umbrella. Such larger beach umbrellas typically have an elongated post with a tapered end for insertion of the post into a support such as the sand. Such umbrellas are easily blown over, unless the post is deeply anchored or the canopy is positioned to face at least partially into the wind. However, beach umbrellas cannot easily be used in the typically compacted soil of a backyard or on the firm surface of a porch or deck.

For such use, large backyard umbrellas typically include weighted bases to support the post vertically and to resist the umbrella from tipping, especially during windy conditions. These bases are usually formed of plastic and are filled with weights, such as sand, rock or concrete. An alternative base is formed from a flat metal plate having a tubular post for receiving the umbrella post. While effectively stabilizing an umbrella canopy, these weighted bases make movement of the backyard umbrellas cumbersome. Further, the bases merely loosely hold the lower end of the post. The post most commonly extends through an opening defined in a top surface of a table. The table top and the base cooperatively maintain the post vertical. The base however resists the umbrella from tipping due to the force of the wind caught in the canopy.

Umbrellas have also been created for unique applications, such as to provide shade to a person standing next to a golf bag, to a person wading in a swimming pool, or to a person sitting in a car. These umbrellas use special brackets or flotation devices to maintain the position of the umbrella. However, these specialized umbrellas are not easily adapted to a variety of uses, as their support devices make it difficult to use the umbrella in different locations.

Furthermore, umbrellas are often useful for covering workers engaged in outdoor activities. For example, road tractors often have a canopy or umbrella over the operator's seat to provide protection from the sun.

Gardeners and other outdoor workers also seek shade during their activities. These workers often require use of a variety of tools, such as clippers, rakes, trowels, shovels, and the like. In some instances gardeners also need to carry trays of plants. When these workers are outside on their hands and knees digging, or are actively engaged in other tasks, they often wear hats to protect themselves from the hot sun. However, hats commonly retain heat, even if mesh fabrics are used in the hats.

Accordingly, there remains a need in the art for improved umbrellas which are easily transported yet stable while the canopy is opened, for protecting outdoor activities from exposure to the sun, with support for tools and the like for use by persons shaded by the umbrella. It is to the provision of such that the present invention is directed.

SUMMARY OF THE PRESENT INVENTION

The present invention meets the need of the art by providing a large shade umbrella that is easily moved between locations for shading work or leisure activities, yet is stable with reduced risk of tipping in typical windy conditions, while providing support for tools and supplies. The selectively moveable umbrella of the present invention provides an umbrella having an elongated post with a first end and a canopy attached to a plurality of support ribs extending from a portion of the post near a second end distal from the first end. A base frame for supporting the elongated post receives the elongated post at the first end. An elongated handle extends outwardly from an edge of the base frame. At least two wheels are attached to the base frame remote from the handle, in order to movably support the base frame. At least one additional support depends from an end of the base frame remote from the wheels. The additional support can itself be a wheel.

The base frame is moveable from a first position to a second position by pulling on the handle. In an alternate embodiment in which the additional support is a nonmobile stop member, the base frame is moveable by lifting upwardly on the handle so that the stop member is lifted off of a supporting surface, and pulling the base frame to a second position where the stop member is repositioned on the supporting surface.

Other objects, features and advantages of the present invention will become apparent upon reading the following detailed description of the disclosed embodiment of the present invention, in conjunction with the appended drawings and claims.

DETAILED DESCRIPTION OF THE PREFERRED EMBODIMENTS

Figure 1:
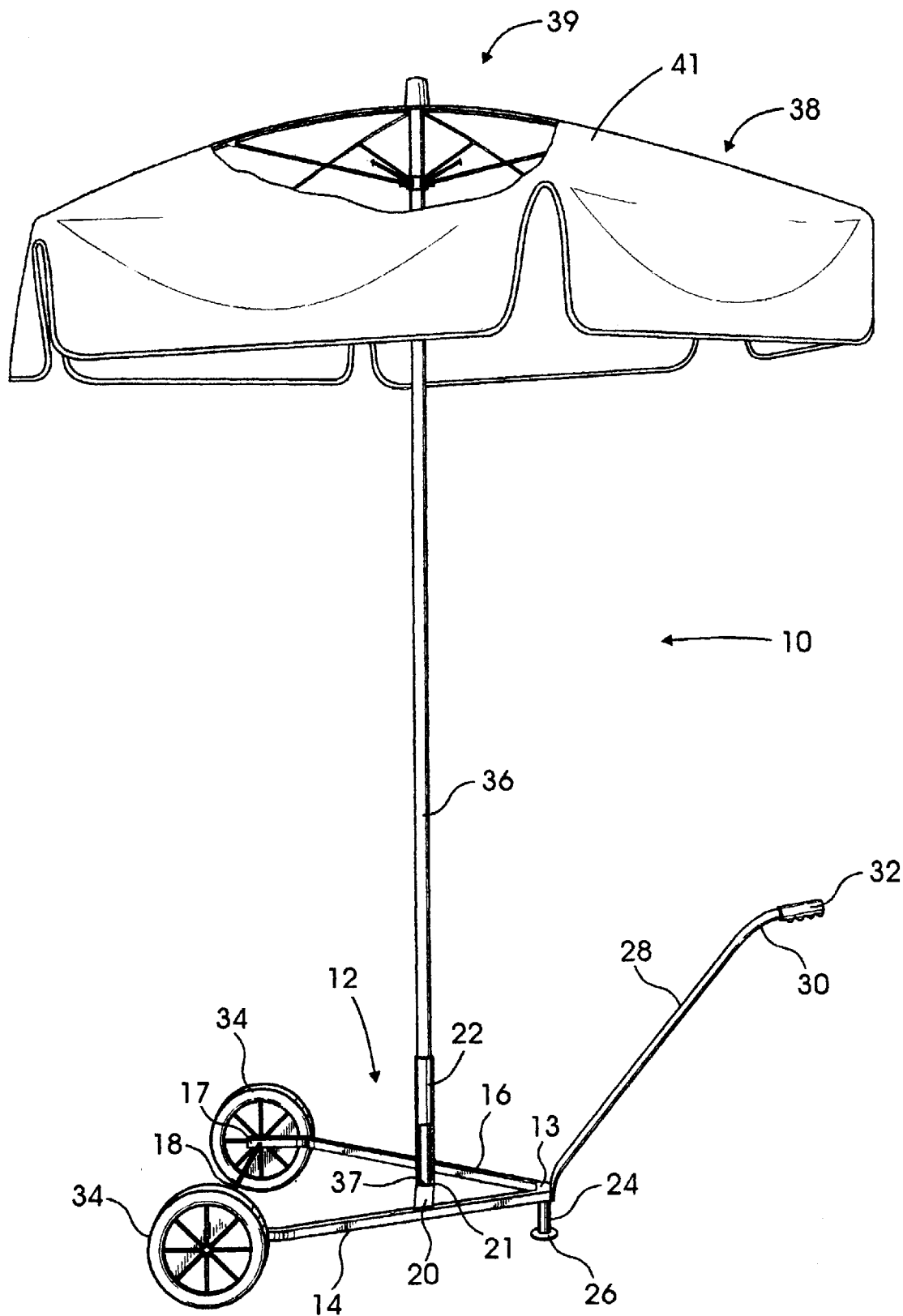
FIG. 1 is a side perspective view of a selectively moveable umbrella according to the present invention.
Figure 2:
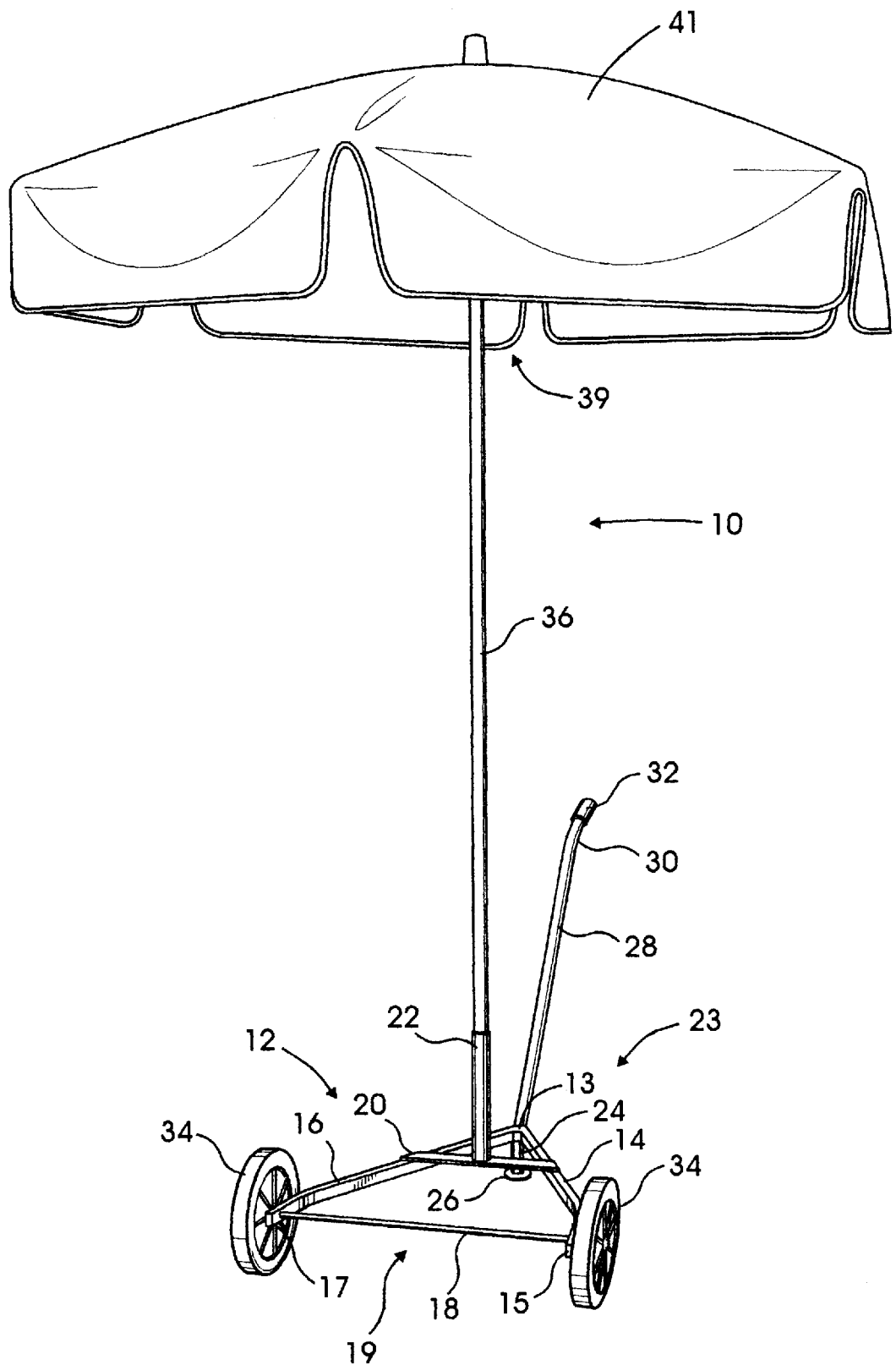
FIG. 2 is a back perspective view of an alternate embodiment of the selectively moveable umbrella of FIG. 1.

Referring now in more detail to the drawings in which like parts have like identifiers, FIG. 1 is a side perspective view of a selectively moveable umbrella 10 according to the present invention for use during recreational and work-related activities. The umbrella 10 includes a base frame 12 having elongated frame members that support wheels. In the illustrated embodiment, the base frame 12 is triangular as defined by a first wheel support 14 and a second wheel support 16 attached at respective distal ends at a connection 13. The first wheel support 14 has a first free end 15 and the second wheel support 16 has a second free end 17, which form the back end 19 of the umbrella 10, as best illustrated in FIG. 2. The first wheel support 14 and second wheel support 16 are preferably elongate members joined at respective distal ends at an oblique angle to define a front end 23 of the umbrella. An axle 18 is connected between the spaced-apart distal end portions 15, 17 of the wheel supports 14, 16, and forms a third side of the base frame 12. Back wheels 34 are conventionally attached to the axle 18 outwardly of each of the free ends 15 and 17.

Figure 3:
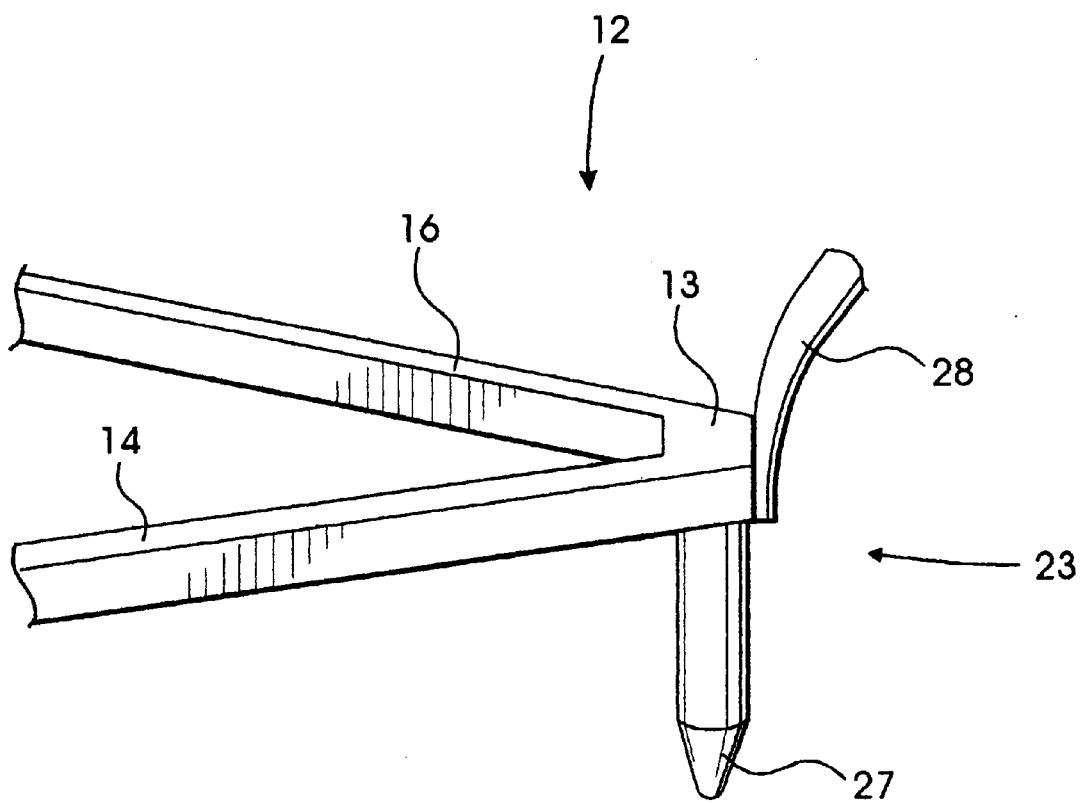
FIG. 3 is a fragmentary view of an alternate embodiment of the selectively moveable umbrella of FIG. 2.

A support member 20 is attached between the first wheel support 14 and the second wheel support 16 intermediate the front end 23 and the back end 19 of the frame. A tubular support 22 is attached generally centrally to the support member 20 and extends upwardly therefrom. An additional support 24, for supporting the base frame 12 upon a supporting surface, depends from the connection 13. The additional support embodiment as illustrated in FIG. 1, is a conventional pivotal wheel 25 with a brake 42. FIG. 2 illustrates a second embodiment, in which the support 24 is a nonmobile stop member 26 defined by a flat disk attached to a lower end of the support 24, as discussed below. FIG. 3 illustrates another embodiment in which the support 24 terminates in a pointed end or tip, as discussed below.

For the purposes of this application, the term "supporting surface" shall encompass all types of walking surfaces, including sand, soil, brick, blacktop, cement, gravel and wood. Preferably the additional support 24 extends a distance from connection 13 approximately equal to the radius of the back wheels 34 so that the base frame 12 is level when it sits on a level supporting surface.

An elongated handle 28 extends outwardly from the connection 13 and away from the base frame 12. The handle 28 is preferably bent to be generally horizontal at its upper free end 30. The handle 28 extends at an upward oblique angle from a connection on the base frame 12 remote from the back wheels 34. A molded grip 32 is slidingly engaged to the end 30. The handle 28 preferably extends beyond the periphery of the umbrella canopy. Alternatively the handle 28 can be of a chain or rope construction, although an elongated tubular structure is preferred for purposes of balance of the umbrella and facilitating ease of use. The tubular support 22, the additional support 24, and the handle 28 are preferably aligned in a plane along a longitudinal axis bisecting the base frame 12. The base frame 12 is preferably made of a metal such as aluminum or steel, or may be heavy beams made from plastic or other materials.

The umbrella 10 includes a conventional umbrella 38 having an elongated post 36 with a first end 37 and a second end 39 distal from the first end. The first end 37 is slidingly received in the tubular support 22. The diameter of the support 22 is closely sized to the diameter of the post 36, to minimize wobble of post in the support. The umbrella 38 in the illustrated embodiment has a conventional fabric canopy 41 which is supported by a plurality of support ribs, extending from the elongated post 36. Alternatively, the tubular support 22 can be telescopingly received within the elongated post first end 37 or can be of a single piece construction with the elongated post. Furthermore, the umbrella may be of a solid plastic construction, permanently fixed in the open position.

FIG. 2 illustrates a back perspective view of an alternate embodiment of the selectively moveable umbrella 10. The tubular support 22 is positioned generally intermediate between the first wheel support 14 and the second wheel support 16. In the illustrated embodiment, the tubular support 22 and the additional support 24 are aligned each on an axis line medial the back wheels 34. In this fashion, the elongated post 36 of the umbrella 10 is supported substantially equally between the spaced-apart back wheels 34 attached to the base frame 12. The additional support 24 as shown in FIG. 2 is an elongated projection or stop member 24, having a free end, and extends downwardly from the connection 13 of the first wheel support 14 and the second wheel support 16 at a point on the base frame remote from the back wheels. The additional support 24 terminates in a stop pad 26. The pad 26 is defined by an outwardly extending flange or disk that provides a stand for the base frame 12 on a supporting surface.

FIG. 3 illustrates a fragmentary view of an alternate embodiment of the selectively moveable umbrella 10 of FIG. 2. In this embodiment, the stop member 24 terminates in a tapered tip 27. The tapered tip 27 is readily insertable into sand or soil for additional support and securing the base frame 12 to the ground.

Alternatively, the selectively moveable umbrella 10 may include more than two back wheels 34 on the base frame 12. If the umbrella does include more than two wheels, then the overall shape of the tubular base frame may be modified to accommodate the increased number of wheels. For instance, it is contemplated that the base frame 12 may be rectangular or hexagonal in shape. Furthermore, the selectively moveable umbrella may be modified to include more than one additional support 24.

In use, the post 36 of the umbrella 38 slidingly inserts in the tubular support 22. The canopy 41 of the umbrella is optionally extended conventionally by movement of the collar along the post 36. Tools and equipment are readily positioned across the first and second wheel supports 14 and 16 and the wheel axle 18. The umbrella 10 is then moved from a first location to a second location, such as in a back yard. With reference to FIG. 1, the brake 42 is released. The umbrella 10 is moved by grasping the handle 30 at the molded grip 32 and pulling to the second location. The brake 42 is then set.

In the alternative embodiments of FIGS. 2 and 3, the umbrella is moved by lifting the handle 30 upwards so that the stop pad 26 or tapered tip 27 is lifted off of the supporting surface. The umbrella 10 in the lifted position is then pulled by the handle 30 to the second location. The handle 30 is then lowered to bring the stop pad 26 or tapered tip 27 again in contact with the supporting surface at the new location.

Thus, the selectively moveable umbrella can readily be moved between the sand of a beach to the compacted soil of a back yard, to a deck of a pool or to the firm surface of a patio area. The spaced-apart back wheels 34 and the counterbalance between the handle 30 and the back wheels, cooperatively stabilize the base frame 12 and umbrella 38, particularly from tipping in a gust of wind, while allowing for the transport of garden and recreational equipment and tools. It is contemplated that the base frame can also include a container or tray surface for holding the outdoor tools or equipment as the selectively moveable umbrella is moved from one location to another.

Additionally, in the alternative embodiment shown in FIG. 3, the tapered tip 27 of the additional support 24 can be forced into soil or sand by pushing the handle 30 downwardly with respect to the umbrella canopy 38. In this manner, the tapered tip 27 of the umbrella 10 anchors the umbrella 38 in sand or soil for additional stability.

The principles, preferred embodiments and modes of operation of the present invention have been described in the foregoing specification. The invention is not to be construed as limited to the particular forms disclosed because these are regarded as illustrative, rather than restrictive. Moreover, variations and changes may be made by those skilled in the art without departing from the spirit of the invention as described by the following claims.

What is claimed is:

1. A selectively moveable umbrella for positioning on a supporting surface comprising:

an umbrella having an elongated post with a first end and a canopy attached to a plurality of support ribs, which support ribs extend radially from the post near a second end distal from said first end;

a triangular base frame wherein the base frame comprises at least a pair of elongate members joined at respective first distal ends at an oblique angle and further having a support vertically attached to the base frame at a substantial central portion of the base frame and receiving the first end of the post to hold a lower portion of the umbrella in a vertical position over the base frame;

at least two back wheels attached to said base frame;

a handle extending from an edge of said base frame;

an additional support depending from an end of said base frame remote from said back wheels.

2. The selectively moveable umbrella as recited in claim 1, wherein the support comprises a tubular member attached to the base frame for receiving the first end of the post for erecting the umbrella over the base frame.

3. The selectively moveable umbrella as recited in claim 1 wherein said handle is elongated.

4. The selectively moveable umbrella as recited in claim 3, wherein the handle comprises an elongate tubular member having a free end, said elongate tubular member extending outwardly of the base frame substantially parallel to a longitudinal axis of the base frame.

5. The selectively moveable umbrella as recited in claim 4, wherein said elongate tubular handle extends outwardly to about a perimeter defined by said canopy of the umbrella in an opened position, for balancing the weight of the base frame, the back wheels and the umbrella canopy.

6. The selectively moveable umbrella as recited in claim 5 wherein said free handle end includes a resilient grip slidingly received thereon.

7. The selectively moveable umbrella as recited in claim 1, wherein the additional support is a front wheel, whereby said base frame, is moveable from a first location to a second location by pulling said handle to the second position where the handle is released.

8. The selectively moveable umbrella as recited in claim 7, wherein the front wheel is pivotable and includes a brake.

9. The selectively moveable umbrella as recited in claim 1, wherein the additional support is a nonmobile stop member, whereby said base frame, being lifted by the handle so that the base frame is supported by the back wheels alone, is moveable from the first location to a second location by pulling said base frame to the second location where the handle is released to reposition the nonmobile stop member on the supporting surface.

10. The selectively moveable umbrella as recited in claim 9, wherein the stop member further comprises a pad for stabilizing the base frame when in contact with the supporting surface.

11. The selectively moveable umbrella as recited in claim 10, wherein said nonmobile stop member further comprises a tapered tip that extends downwardly from the base frame for securing the base frame to the supporting surface.

\* \* \* \* \*